(12) United States Patent
Alidedeoglu et al.

(10) Patent No.: US 9,145,470 B2
(45) Date of Patent: *Sep. 29, 2015

(54) METHOD FOR THE PREPARATION OF POLYALKYLENE TEREPHTHALATE RESIN COMPOSITIONS EMPLOYING TITANIUM-CONTAINING CATALYST COMPLEX

(71) Applicants: Husnu Alp Alidedeoglu, Evansville, IN (US); Ganesh Kannan, Evansville, IN (US); Tianhua Ding, Newburgh, IN (US); Tukaram Gunale, Bangalore (IN)

(72) Inventors: Husnu Alp Alidedeoglu, Evansville, IN (US); Ganesh Kannan, Evansville, IN (US); Tianhua Ding, Newburgh, IN (US); Tukaram Gunale, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 121 days.

This patent is subject to a terminal disclaimer.

(21) Appl. No.: 13/950,844

(22) Filed: Jul. 25, 2013

(65) Prior Publication Data

US 2014/0027945 A1 Jan. 30, 2014

Related U.S. Application Data

(60) Provisional application No. 61/677,224, filed on Jul. 30, 2012.

(51) Int. Cl.
| | |
|---|---|
| *C08G 63/85* | (2006.01) |
| *C08G 63/183* | (2006.01) |
| *C08K 3/40* | (2006.01) |
| *C08K 5/103* | (2006.01) |
| *C08L 67/06* | (2006.01) |
| *C08L 69/00* | (2006.01) |

(52) U.S. Cl.
CPC .............. *C08G 63/85* (2013.01); *C08G 63/183* (2013.01); *C08K 3/40* (2013.01); *C08K 5/103* (2013.01); *C08L 67/06* (2013.01); *C08L 69/00* (2013.01)

(58) Field of Classification Search
CPC ...... C08G 63/85; C08G 63/183; C08L 67/06; C08K 5/103; C08K 3/40
See application file for complete search history.

(56) References Cited

U.S. PATENT DOCUMENTS

| | | | |
|---|---|---|---|
| 2,012,267 A | 8/1935 | Carothers | |
| 4,096,156 A | 6/1978 | Freudenberger et al. | |
| 4,328,059 A | 5/1982 | Horlbeck et al. | |
| 6,020,393 A | 2/2000 | Khemani | |
| 6,066,714 A | 5/2000 | Putzig et al. | |
| 6,303,738 B1 | 10/2001 | Putzig et al. | |
| 6,472,557 B1 | 10/2002 | Pell, Jr. et al. | |
| 6,762,235 B2 | 7/2004 | Takenaka et al. | |
| 7,129,301 B2 | 10/2006 | Wu et al. | |
| 2004/0254330 A1* | 12/2004 | Duan et al. ................... 528/275 |
| 2005/0113534 A1 | 5/2005 | Agarwal et al. | |
| 2013/0018143 A1 | 1/2013 | Alidedeoglu et al. | |
| 2013/0053461 A1* | 2/2013 | Alidedeoglu et al. ........ 521/48.5 |

FOREIGN PATENT DOCUMENTS

| | | | |
|---|---|---|---|
| EP | 0634435 A1 | 6/1994 | |
| EP | 1013692 A2 | 12/1999 | |
| WO | 9928033 A1 | 6/1999 | |

OTHER PUBLICATIONS

International Searching Authority, International Search Report, PCT/US2013/052057, Date of mailing Oct. 14, 2013, 5 pages.
JP 60-147430 A, Publish date: Aug. 3, 1985; Abstract, 1 pages.
International Searching Authority, Written Opinion, PCT/US2013/052057, Date of mailing: Oct. 14, 2013, 8 pages.

* cited by examiner

*Primary Examiner* — Frances Tischler
(74) *Attorney, Agent, or Firm* — Cantor Colburn LLP (57) ABSTRACT

A process of preparing a polyalkylene terephthalate comprising reacting an alkylene diol and an aromatic dicarboxy compound that is an aromatic dicarboxylic acid, aromatic dicarboxylic ($C_1$-$C_3$)alkyl ester, or a combination thereof, wherein ester interchange and polymerization occurs in the presence of a catalyst complex formed by the reaction of tetraisopropyl titanate and a boron, phosphorous or nitrogen-containing complexing agent, which catalyst can be synthesized in situ prior to ester interchange and introduced to a mixture of the alkylene diol and the aromatic dicarboxy compound prior to ester interchange.

16 Claims, 2 Drawing Sheets

METHOD FOR THE PREPARATION OF POLYALKYLENE TEREPHTHALATE RESIN COMPOSITIONS EMPLOYING TITANIUM-CONTAINING CATALYST COMPLEX

CROSS REFERENCE TO RELATED APPLICATIONS

This application claims priority to U.S. Provisional Application Ser. No. 61/677,224 filed on Jul. 30, 2012, which is incorporated herein by reference in its entirety.

BACKGROUND

This invention relates to methods for the manufacture of polyalkylene terephthalate resin compositions. In particular, a polyalkylene terephthalate resin such as poly(butylene terephthalate) is prepared employing a titanium-containing catalyst complex comprising a phosphorous, nitrogen, or boron atom.

Polybutylene terephthalate (PBT) resin is a well-known polyalkylene terephthalate that is semi-crystalline and has several desirable properties alone or in blends. Compared to amorphous resins such as acrylonitrile butadiene styrene (ABS), polycarbonate, and polystyrene, a semi-crystalline resin like PBT can show higher solvent resistance, strength, and stiffness due to the presence of crystalline spherulites in the resin. PBT resin is used in many applications in which its solvent resistance, strength, rigidity, and lubricity are needed, most commonly in durable goods that are formed by injection molding. Applications include electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. Additionally, PBT is widely used to form electrical connectors. Through its many blended products PBT can be tailored to a wide variety of applications.

It is generally known that PBT can be made by reacting 1,4-butanediol (BDO) with terephthalic acid (TPA) or dimethyl terephthalate (DMT) in the presence of a transesterification catalyst. U.S. Pat. Nos. 7,129,301; 6,020,393; 4,328,059, and US Patent Pub. 2005/0113534 A1 disclose various catalysts for the polymerization of polyesters.

Commonly used catalysts for the polymerization of PBT include tetraalkyl titanates. Among the various titanates are tetraisopropyl titanate, tetrabutyl titanate, and tetra(2-ethylhexyl) titanate. For example, JP 60147430 discloses a method of producing polyester by esterifying terephthalic acid, adipic acid and 1,4-butanediol in the presence of a titanium compound and a pentavalent phosphorus compound. U.S. Pat. No. 6,303,738 discloses a process for producing copolyester containing adipic acid in the presence of TYZOR® IAM (available from DuPont), which is prepared through the combination of tetraisopropyl titanate (TPT) and a mixture of butyl phosphate and dibutyl phosphate.

The catalyst used to prepare PBT is not typically quenched (deactivated) at the end of the polymerization process. An active catalyst in the resin, however, can sometimes lead to undesirable reaction of the PBT in subsequent processing. Blends containing polyalkylene terephthalates such as PBT, on exposure to high temperature and humidity, can exhibit hydrolytic degradation, especially under caustic conditions. Another problem associated with some blends is transesterification, which can lead to loss of mechanical properties. Catalyst quenchers can be added to thermoplastic compositions that comprise the polyalkylene terephthalate resin to prevent such transesterification, but such quenchers can also promote degradation of polymer chains and contribute to decrease in hydrolytic stability. Quenchers have included conventional phosphorous derivatives such as phosphoric acid and phosphates. Phosphite stabilizers are less satisfactory because of the tendency to be unstable to both hydrolysis and oxidation.

Insufficient hydrostability of polyalkylene terephthalate can lead to chain cleavage, the extent of which can depend on the exact conditions of exposure to water or humidity. Temperature, time of exposure, and pH are all important. Both acids and bases can catalyze ester hydrolysis of polyalkylene terephthalate. Thus, if exposed to water that is acidic or basic, or if the polymer matrix involves free acidic or basic additives, decomposition can be accelerated. Since one of the reaction products of PBT hydrolysis is itself a carboxylic acid, the hydrolytic decomposition of PBT is autocatalytic.

In view of the above, there remains a need for new catalysts for the production of polyalkylene terephthalates that are effective in polymerization but that do not have potentially adverse effects in association with the polyalkylene terephthalate resin, or in blends thereof, after polymerization has been completed.

BRIEF DESCRIPTION OF THE INVENTION

The present invention is directed to the preparation of polyalkylene terephthalates by employing a polyesterification catalyst that comprises a complex that is the reaction product of a tetra($C_1$-$C_8$ alkyl) titanate and a compound selected from phosphorus-containing compounds, nitrogen-containing compounds, and boron-containing compounds, which catalyst can be synthesized in situ, prior to ester interchange, for use during the ester interchange and polymerization stages of the manufacturing process.

In an embodiment, a process of preparing a polyalkylene terephthalate comprises reacting an alkylene diol and a dicarboxy aromatic compound selected from the group aromatic dicarboxylic acids, aromatic dicarboxylic ($C_1$-$C_3$)alkyl esters, and combinations thereof, wherein the process comprises forming a catalyst consists of the reaction product of tetra($C_1$-$C_8$ alkyl) titanate such as tetraisopropyl titanate and a complexing agent selected from the group phosphorus-containing compounds, nitrogen-containing compounds, boron-containing compounds, and combinations thereof; obtaining ester interchange by combining the catalyst with the alkylene diol and the aromatic dicarboxy compound; and polymerizing the product of ester interchange, in the continued presence of the catalyst. The catalyst can be formed in situ prior to the ester interchange stage, specifically formed in a solution comprising the alkylene diol. The catalyst can be formed shortly before the ester interchange takes place, i.e., the alkylene diol and diacid are combined, specifically within 48 hours, more specifically within 24 hours, for example, within a time space of 12 hours or less.

In another embodiment, a process of preparing a polyalkylene terephthalate comprises reacting an alkylene diol and an aromatic dicarboxy compound selected from the group aromatic dicarboxylic acids, aromatic dicarboxylic ($C_1$-$C_3$)alkyl esters, and combinations thereof, comprising:

forming a catalyst in situ, in a first mixture, by combining tetra($C_1$-$C_8$ alkyl) titanate, a one or more phosphorus-containing compounds, and alkylene diol, prior to introduction of the aromatic dicarboxy compound, wherein the first mixture is subjected to heat at an elevated first temperature, and wherein the catalyst that is formed consists of the reaction product of the tetra($C_1$-$C_8$ alkyl) titanate and the one or more phosphorous-containing compound in the molar ratio of phosphorous-compound:tetraisopropyl titanate of from more than 0.05:1 to less than or equal to 2:1;

forming a second mixture by introducing the aromatic dicarboxy compound, optionally with additional alkylene diol, into the first mixture and subjecting the second mixture to heat to obtain ester interchange at an elevated second temperature; and polymerizing the second mixture under vacuum, after substantial completion of the ester interchange, optionally with distillation, at a pressure of less than 2 Torr and at an elevated third temperature for polymerization, higher than the elevated second temperature for ester interchange, and in the range of 220 to less than 270° C., thereby polymerizing the second mixture and forming molten polyalkylene terephthalate, and stopping polymerization when obtaining the desired intrinsic viscosity of 0.4 to 2.0 dl/g.

In still another embodiment, a process of forming a thermoplastic composition comprises blending, based on the total weight of the thermoplastic, the following:

from greater than 50 to 99.99 wt. % of polyalkylene terephthalate resin made by one of the above-described processes;

from 0 to 50 wt. % of filler;

from 0 to 20 wt. % of an impact modifier or other polymer;

from 0.01 to 5 wt. % of at least one additive selected from a nucleating agent, antioxidant, UV stabilizer, plasticizer, epoxy compound, melt strength additive, crosslinker, and combinations thereof; wherein no quencher for the catalyst complex is added to the thermoplastic composition;

and extruding, calendaring, extrusion molding, blow molding, solvent casting, or injection molding of compounded thermoplastic composition.

This present process solves the problem in the prior art regarding undesirable post-polymerization catalytic activity. In particular, the in situ titanium-based catalyst system can improve hydrolytic stability and reduce or eliminate undesirable transesterification reactions during later processing. Furthermore, the catalyst system allows the exclusion of catalyst quenchers in thermoplastic compositions containing the polyalkylene terephthalate resin composition, for example, during compounding or compounding of additives, for example prior to or during extrusion. As a result, because of the reduced amount or absence of catalyst quencher during blending or compounding of the polyalkylene terephthalate with other components, the resulting thermoplastic composition and articles made therefrom can show improved properties such as increased hydrolytic stability.

These and other features, aspects, and advantages will become better understood with reference to the following description and appended claims.

DETAILED DESCRIPTION OF THE INVENTION

The present inventors have found a catalyst that is both surprisingly effective for preparing a polyalkylene terephthalate and capable of reducing adverse effects associated with previously used catalysts.

As used herein, the singular forms "a," "an," and "the" include plural referents unless the context clearly dictates otherwise. Further, unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. As used in chemical formulas, a dash ("-") that is not between two letters or symbols is used to indicate a point of attachment for a substituent. For example, —CHO is attached through carbon of the carbonyl group.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (–O($C_2H_4$)—), as would be understood by one of ordinary skill in the art. The terms "diacid groups" (or "dicarboxy groups") and "diol groups" generically refer to such groups.

The term "random copolymer," as used in this application, refers to polymer that includes macromolecules in which the probability of finding a given monomeric repeat unit at any given site in the chain is independent of the nature of the adjacent units. The term "polyalkylene terephthalate" as used herein refers to polymers in which at least 90 mol %, specifically at least 95 mol %, more specifically at least 98 mol %, most specifically essentially 100 mol % of the diacid groups in the polyalkylene terephthalate are isophthalic and/or terephthalic acid groups, specifically terephthalic groups. Thus, polyalkylene terephthalates comprise diacid groups of which no more than 10 mol %, specifically no more than 5 mol %, more specifically no more than 2 mol %, and most specifically essentially zero mol %, are adipic acid groups. In an embodiment, the polyalkylene terephthalate can include cyclohexanedimethanol groups, whereas in a second embodiment the polyalkylene terephthalate comprises diol groups of which no more than 2 mol % are cyclohexanedimethanol groups, specifically essentially zero mol % are cyclohexanedimethanol groups. In an embodiment, at least 95 mol % of the diacid groups in the polyalkylene terephthalate are terephthalic acid groups and at least 95 mol % of the diol groups in the polybutylene terephthalate are butanediol groups.

The term "recycle" as used herein refers to any component that has been manufactured and either used or intended for scrap. Thus, recycle polyester can be polyester that has been used, for example, in drinking bottle, or that is a byproduct of a manufacturing process, for example, that does not meet a required specification and therefore would otherwise be discarded or scrapped. Recycle materials can, therefore, contain virgin materials that have not been utilized.

The prefix "bio-" or "bio-derived" as used herein means that the compound or composition is ultimately derived (by humans) from a biological source or biomass, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Succinic acid from biomass is commercially available from several sources including Diversified Natural Products Inc. under the trade name BioAmber™. This succinic acid can be easily converted into 1,4-butanediol by processes described in several published documents such as U.S. Pat. No. 4,096,156, incorporated herein in its entirety. Another process that describes converting succinic acid into 1,4-butanediol is described in Life Cycles Engineering Guidelines by Smith et al., EPA publication EPA/600/R-1/101 (2001).

The present process can be used to prepare polyalkylene terephthalate containing aromatic dicarboxylic acid groups incorporated into the polyester when a dicarboxy aromatic compound, for example an aromatic dicarboxylic acid, reacts with an alkylene diol under conditions sufficient to form the polyester. Examples of the aromatic dicarboxylic acid group include isophthalic acid groups, terephthalic acid groups, and a combination thereof. The aromatic dicarboxylic group in the polyester can also be derived from corresponding di($C_1$ to $C_3$) alkyl esters. In a preferred embodiment, the aromatic dicarboxylic acid group is derived from terephthalic acid or di($C_1$-$C_3$)alkyl ester thereof.

The titanium catalyst comprises the reaction product of a tetra($C_1$-$C_8$alkyl) titanate such as tetraisopropyl titanate and a complexing agent selected from:

(1) phosphorus-containing compounds, at a molar ratio of the phosphorus-containing compound:titanate from 0.05:1 to less than or equal to 2:1, specifically 0.2:1 to 1.6:1, more specifically 0.3:1 to 1.3:1, most specifically 0.5:1 to 1.2:1, (2) nitrogen-containing compounds, at a molar ratio of the nitrogen-containing compound:titanate from 0.05:1 to less than or equal to 2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 2:1, specifically 0.2:1 to 1.2:1, more specifically 0.3:1 to 1.2:1, most specifically 0.5:1 to 1.2:1, and (4) combinations thereof.

Phosphorus-containing compounds can include, for example, phosphoric acid, poly(phosphoric acid), phosphorous acid, monobutyl phosphate, dibutyl phosphate, monoalkyl phosphates, dialkyl phosphates, and combinations thereof. Specifically, the phosphorous-containing compound can be a compound in which the phosphorus atom is bound to four oxygen atoms, more specifically a compound that is not a metallic salt. Thus, the catalyst can be the reaction product of a tetraalkyl titanate and a phosphorous-containing compound in which less than 50 mol %, specifically less than 25 mol %, more specifically essentially zero mol %, of the phosphorous-containing compound is associated with a metallic ion, specifically Li, Na, K, Ca, Mg, Ba, Zn, or mixtures thereof. More specifically, the phosphorous-containing compound comprises only one phosphorous atom per molecule. Thus, the formation of chelating ligands can be excluded in preparing the catalyst. In an embodiment, phosphonate and phosphonic acid compounds are excluded.

In particular, the present process can comprise forming a catalyst in situ by combining a tetra($C_1$-$C_8$ alkyl) titanate such as tetraisopropyl titanate with a complexing agent such as phosphoric acid and an alkylene diol, prior to transesterification and polymerization. By "in situ" is meant that the catalyst, a titanium complex, is not premade but is formed during the process in the presence of one or more components of the process. Thus, the catalyst is present during the transesterification and polymerization reactions.

In preparing the catalyst, the tetra($C_1$-$C_8$ alkyl) titanate, for reaction with the complexing agent, can be provided in a total amount of 25 to 1000 ppm, based on the total weight of the composition. The catalyst can be present in the process, during depolymerization and polymerization, in the amount of 10 to 1000 ppm, specifically 25 to 500 ppm, more specifically 35 to 250 ppm, most specifically 45 to 200 ppm, of titanium (Ti) based on the total weight of the composition (as well as based on the resulting solid product).

Nitrogen-containing compounds for forming the catalyst complex can include alkyl amines, aromatic amines, alkyl aromatic amines, alkanol amines, ammonium compounds, and combinations thereof.

Boron-containing compounds can include boric acid, boron alkoxides, boric oxides, boron halides, metaborates, monoalkyl borates, dialkyl borates, trialkyl borates, borazines, and combinations thereof.

In reference to the nitrogen-containing, phosphorous-containing, and boron-containing compounds, the term "alkyl" refers to branched or straight chain monovalent saturated groups comprising carbon and hydrogen, specifically having 1 to 12, more specifically 1 to 6, most specifically 1-3 carbon atoms. Specifically, alkanol can have an analogous number of carbon atoms. Aromatic compounds have at least one, specifically one, two or three $C_6$-$C_{12}$ aryl groups (for example phenyl, naphthyl, or the like) containing only carbon in the aromatic ring, optionally substituted. Exemplary substituents can include halogen, cyano, nitro, hydroxyl, alkyl, alkoxy, arylalkoxy, and combinations thereof.

In general, preparation of a polyalkylene terephthalate, specifically PBT, by melt-process polycondensation is well known to those skilled in the art. Conventional polycondensation procedures are described, for example, in U.S. Pat. No. 2,012,267. Such reactions are typically operated at temperatures from 150° C. to 300° C. in the presence of a catalyst employed in amounts between 10 to 1000 parts per million (ppm), based on total weight of the reactants. A branched polyalkylene terephthalate can be prepared in which a branching agent, for example, a glycol having three or more hydroxyl groups or a trifunctional or multifunctional carboxylic acid has been incorporated.

For example, conventional processes are known by which a poly(1,4-butylene terephthalate) or "PBT" resin can be obtained by polymerizing a glycol component at least 90 mol %, specifically at least 95 mol %, of which consists of tetramethylene glycol and an acid or ester component at least 90 mol %, specifically at least 95 mol %, of which consists of terephthalic acid. The present process can be used in cooperation with, or adapted to, methods (or elements of methods) available in the prior art, as will be appreciated by one of ordinary skill in the art.

In particular, the present process can comprise forming the catalyst in situ by combining the tetra($C_1$-$C_8$ alkyl) titanate, complexing agent, and alkylene diol (prior to introduction of the aromatic dicarboxy compound) to form a first mixture, wherein the first mixture is subjected to heat at an elevated first temperature.

The aromatic dicarboxy compound can then be subsequently introduced, optionally with additional alkylene diol, into the first mixture to form a second mixture, which can be subjected to heat to obtain ester interchange at an elevated second temperature, specifically at a temperature that is higher than the first temperature. In an embodiment, the ester interchange is carried out until the production of methanol volatiles substantially ceases.

Polymerization can be initiated and carried out under vacuum, after substantial completion of the ester interchange, by further increasing the temperature to a third temperature higher than the second temperature. In particular, the second mixture can be subjected to vacuum, optionally with distillation, at a pressure of less than 2 Torr and a temperature of 220° C. to 270° C., to form molten polyalkylene terephthalate.

By way of illustration, a titanium-containing catalyst comprising the reaction product of tetra($C_1$-$C_8$ alkyl) titanate such as tetraisopropyl titanate and a phosphorous-containing compound, for example, phosphoric acid, can be formed in situ as shown by the following schematic representation:

As stated above, the present process of preparing a polyalkylene terephthalate can be by melt polycondensation comprising reacting an alkylene diol and a dicarboxy compound selected from the group an aromatic dicarboxylic acid, an aromatic dicarboxylic ($C_1$-$C_3$)alkyl ester, and combinations thereof, wherein ester interchange and polymerization occurs in the presence of a catalyst formed by reaction of a tetra($C_1$-$C_8$ alkyl) such as titanate tetraisopropyl titanate and a compound selected from phosphorus-containing compounds, nitrogen-containing compounds, boron-containing compounds, and combinations thereof, wherein the catalyst is synthesized in situ.

As illustrated, the in situ reaction between phosphoric acid and titanium isopropoxide (TPT) in diol solvent (for example, butanediol) can achieve a complete conversion in the reaction between the most acidic hydroxyl group of the phosphoric acid and TPT. Without wishing to be bound by theory, it is believed that once all strongly acidic hydroxyl groups are consumed, the ester interchange and polymerization (polyesterification or polycondensation) can be conducted without inhibition. After the catalyst preparation, all the monomer components can be introduced into the reactor, and the reaction temperature can be increased, for example to 220° C., to complete the ester interchange, followed by polycondensation, for example at 250° C.

The alkylene diol groups incorporated into the polyalkylene terephthalate according to the present process can be derived from any alkylene diol, including cyclic and non-cyclic alkylene diols, that can react with the aromatic dicarboxy compound to form the polyalkylene terephthalate. Examples of suitable alkylene diols can include ethylene glycol, 1,2-propylene glycol, 1,3-propylene glycol, 1,2-butanediol, 2,3-butanediol, 1,4-butanediol, tetramethyl cyclobutanediol, cyclohexane dimethanol (including 1,2-, 1,3-, and 1,4-cyclohexane dimethanol), hexylene glycols, and combinations thereof. In an embodiment, the alkylene diol is selected from 1,4-butanediol, 1,3-propanediol, ethylene glycol, and combinations thereof. Any of the foregoing alkylene diols can be bio-derived from a biological source, for example, biomass.

The aromatic dicarboxy compound used in the present process can include dimethyl terephthalate derived from recycled PET. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate (DMT).

The present process excludes or limits the presence of aliphatic dicarboxylic acid monomers to form the polyalkylene terephthalate, which monomers comprise less than 5 wt. % of the polyalkylene terephthalate, specifically less than 2 wt. %, more specifically essentially zero wt. %. Thus, aliphatic dicarboxylic compounds having the general formula $(CH_2)_m(COOH)_2$, where m is an integer from 2 to 12, are excluded from use in preparing the polyalkylene terephthalate. Specifically, aliphatic dicarboxylic acids such as decanedioic acid, adipic acid, and sebacic acid are excluded or limited to insignificant amounts in the present process.

Examples of polyalkylene terephthalate that can be prepared by the present process include, for example, polyethylene terephthalate ("PET"), poly(1,4-butylene terephthalate) ("PBT"), polypropylene terephthalate ("PPT"), polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, polydianol terephthalates, and combinations thereof.

The process can also be employed to prepare a polyalkylene terephthalate that is a copolyester derived from terephthalic acid (specifically terephthalic acid and/or isophthalic acid) and a mixture comprising a linear $C_{2-6}$ aliphatic diol (specifically ethylene glycol and butylene glycol); and a $C_{6-12}$ cycloaliphatic diol (specifically 1,4-cyclohexane diol, dimethanol decalin, dimethanol bicyclooctane, 1,4-cyclohexane dimethanol and its cis- and trans-isomers, 1,10-decane diol, and the like). The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylene-dimethylene terephthalate) wherein greater than 50 mol % of the ester groups are derived from ethylene (PTCG). Thus, the term "alkylene diol" as used herein is meant to include both aliphatic and cycloaliphatic alcohols.

It is to be understood that the present process of preparing a polyalkylene terephthalate can comprise relatively lesser amounts of isophthalate groups and specifically less than 10 wt. %, more specifically less than 5 wt. %, most specifically less than 2 wt. % of acid groups other than terephthalate groups, isophthalate groups, and alkylene diol groups (cyclic alkylene diol groups and non-cyclic alkylene diol groups).

In an embodiment, the present process is used to prepare a polyalkylene terephthalate having a number average molecular weight of at least 15,000 g/mol, specifically 20,000 to 200,000 g/mol) and a polydispersity index from 2 to less than 6, specifically 2 to 5. In such an embodiment, the modified polyalkylene terephthalate, specifically the modified PBT, has a melting temperature ($T_m$) ranging from 150 to 223° C., specifically 200 to 218° C., more specifically 204 to 210° C. The molecular weight can be obtained using polystyrene standards, as measured by gel permeation chromatography in chloroform/hexafluoroisopropanol (5:95, volume/volume ratio) at 25° C.

The polyalkylene terephthalate can have an intrinsic viscosity (as measured in phenol/tetrachloroethane (60:40, volume/volume ratio) at 25° C.) of 0.4 to 2.0 deciliters per gram. In an embodiment, the PBT resin has an intrinsic viscosity of 0.6 to 1.4 dl/g.

The modified polyalkylene terephthalate resin composition prepared by the present process can be blended with other components to obtain a thermoplastic composition containing the resin composition. There can be compounded known substances, which are generally added to thermoplastic resins and thermosetting for the purpose of imparting desired properties corresponding to the product being made. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example, an antioxidant, a UV absorber, and a mold release agent. The total amount of additives (other than any impact modifier, filler, or reinforcing agents) is generally 0.01 to 15 wt. %, based on the total weight of the composition.

In a specific embodiment, from 0.01 to 5.00 wt. % of a nucleating agent, antioxidant, UV stabilizer, plasticizers, epoxy compound, melt strength additive, or a combination thereof is used. For example, a stabilizer component is optionally present in the modified polyalkylene terephthalate resin composition, in an amount from more than 0 to 3 wt. %, specifically 0.001 to 2 wt. %, even more specifically 0.005 to 1.5 wt. %. As used herein, a "stabilizer" is inclusive of an antioxidant, thermal stabilizer, radiation stabilizer, ultraviolet light absorbing additive, and combinations thereof. In an embodiment, the stabilizer component comprises an antioxidant.

A thermoplastic composition can be prepared that is characterized by the absence of a catalyst quencher such as an acid interchange quencher. Thus, a process according to the present invention can be further characterized by excluding (not adding) a catalyst quencher as a means for quenching the catalyst in the thermoplastic composition containing the modified polyalkylene terephthalate resin composition.

Quenchers are agents that inhibit activity of any catalysts that can be present in the thermoplastic composition, in order to prevent an accelerated interpolymerization and degradation of the polymer in the thermoplastic composition. Such quenchers can be selected from the group acidic phosphate salts, acid phosphites, alkyl phosphites, aryl phosphites, mixed phosphites and combinations thereof, specifically acidic phosphate salts; acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts can include sodium dihydrogen phosphate, mono zinc phosphate, potassium hydrogen phosphate, calcium dihydrogen phosphate and the like. Specific quenchers are phosphoric acid, phosphorous acid or their partial esters such as mono zinc phosphate. More specifically, quenchers that can be added to the thermoplastic composition can include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof.

In addition to the above-described additives, used accessorily in a small amount depending on the object, other polymers resins, typically in an amount less than 50 weight percent, specifically less than 30 wt. %, more specifically less that 20 wt. %, of the total composition, can be added to the thermoplastic resin composition containing the polyethylene terephthalate prepared according to the present process. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to the polyalkylene terephthalate, other polyesters can optionally be present in the thermoplastic composition (in an amount of less than 50 weight percent, specifically less than 30 wt. %, more specifically less that 20 wt. %, most specifically less than 10 wt. % of the total composition) provided that such polyesters do not significantly and adversely affect the desired properties of the composition.

For example, a thermoplastic composition can include, in addition to the modified polyethylene terephthalate prepared by the present process, other aromatic polyesters, cycloaliphatic polyesters, and the like. The additional polyesters can be virgin polyesters or wholly or partially bio-derived, including petroleum-derived aromatic polyesters and bio-derived aromatic polyesters.

The thermoplastic composition comprising the polyalkylene terephthalate prepared as described herein, can also optionally comprise at least one reinforcing filler. For example reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In an embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 μm, specifically 8-18 μm is impregnated with melted PBT polyester. After cooling, the impregnated bundle is cut into pellets having a length of >5 mm, specifically, >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length>4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

In an embodiment, a reinforcing filler, for example a glass fiber, is present in the composition in an amount from 5 to 50 wt. %, specifically from 10 to 45 wt. %, more specifically from 20 to 40 wt. %, and most specifically, from 25 to 35 wt. %.

In still other embodiments, a thermoplastic composition can be made that optionally additionally comprises a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. The equivalent spherical diameter of the particle can be used to determine particle size. Use of these types of filler can provide molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

When present, particulate filler is used in an amount between zero and 20 wt. %, specifically between 0 to 10 wt. %, more specifically between 0.1 to 5 wt. %.

The thermoplastic composition can be prepared by blending the components employing a number of procedures. In an exemplary process, the polyalkylene terephthalate, and specifically a polybutylene terephthalate, optional reinforcing filler, and any optional other polymer or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The composition and any optional components can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Useful articles can be advantageously made from the polyalkylene terephthalate, or thermoplastic compositions containing the polyalkylene terephthalate, prepared by the present process. In a specific embodiment, an article is extruded, calendared, or molded (for example, blow molded or injection molded) from the polyalkylene terephthalate or blend thereof. The article can be a film or a sheet. When the article is a film, the article can be formed by extrusion molding or calendaring the polyalkylene terephthalate or thermoplastic composition containing the polyester.

The compositions made from the present process can provide products having superior hydrolytic stability. In particular, such compositions can provide improved hydro and heat resistance in abusive molding and outdoor application.

As stated above, various combinations of the foregoing embodiments can be used. All cited patents, patent applications, and other references are incorporated herein by reference in their entirety.

The invention is further described in the following illustrative examples in which all parts and percentages are by weight unless otherwise indicated.

EXAMPLES

Following is a list of materials, acronyms, and selected sources used in the examples.

BDO: 1,4-Butanediol (from BASF, with a purity specification of 99.5 wt. %)

DMT: Dimethyl Terephthalic acid (from Acros)

TPT: Tetraisopropyl titanate, also referred to as titanium tetraisopropoxide (from DuPont, commercial TYZOR grade)

HP: Phosphoric acid (from Acros)

PBT: Poly(butylene terephthalate) as synthesized

Equipment

The PBT resins were prepared as a lab scale in a 1-L 3-necked round bottom flask equipped with a condenser and a vacuum output.

Procedures and Testing of Polyester Resins

Dynamic scanning calorimetry (DSC), employing a Perkin Elmer® DSC 7 equipped with Pyris DSC 7 software, was used to determine melting characteristics of the polymers synthesized. In a typical procedure, a polymer sample (10-20 mg) was heated from 50° C. to 200° C. (20° C./min), held at 200° C. for 1 min, cooled back to −50° C. (20° C./min), then held at −50° C. for 1 min, and the above heating/cooling cycle was repeated. The second heating cycle is usually used to obtain the $T_m$ data.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Examples 1-7

Comparative Example C-1

In Comparative Example 1, PBT was prepared on a lab scale from DMT and 1,4-butanediol (BDO) in which 87.4 g of DMT and 140 g of BDO were introduced into a three-neck round bottom flask. The reactor was placed in an oil bath at a temperature of 170° C. Then 250 ppm of TPT was added to the reaction mixture and the ester interchange temperature was increased to 220° C. at a rate of 2° C./min while stirring at 260 rpm under nitrogen. Evolution of methanol was collected separately until no more droplets of the methanol were collected. The temperature of the reaction mixture was increased further to 250° C. The polymerization stage was initiated with vacuum adjusted to below 1 Torr for 1 hour. The polymerization was stopped after achieving the desired intrinsic viscosity.

Example 2

Example 1 was implemented in the presence of the new titanium-containing catalyst prepared in situ by complexation between titanium tetraisopropoxide (TPT) and phosphoric acid at 1:0.3 mol ratio. First, 50 g of BDO and the phosphoric acid solution in water (0.1 g/ml) were introduced into a three-neck round bottom flask. The reactor was placed in an oil bath temperature of 175° C. After 20 minutes, 250 ppm of TPT was added to the reactor and an in situ complexation between the phosphoric acid and TPT was carried out for 40 minutes under $N_2$ atmosphere to form a catalyst solution. Then, 87.4 g of DMT and 80 g of additional BDO were introduced into the catalyst solution and, for ester interchange, the temperature was increased to 220° C. at a rate of 2° C./min while stirring at 260 rpm under nitrogen. After the volatiles from methanol ceased, the temperature of the reaction mixture was further increased to 250° C. The polymerization was initiated with the vacuum adjusted to below 1 Torr for 40 minutes. Finally, the polymerization was stopped after achieving the desired intrinsic viscosity.

Example 3

Example 3 was implemented in the presence of the new titanium-containing catalyst prepared in situ through the complexation between TPT and phosphoric acid in a 1:0.6 mol ratio. First, 50 g of BDO and the phosphoric acid solution (0.1 g/ml in water) were introduced into a three-neck round bottom flask. The reactor was then placed in an oil bath temperature of 175° C. After 20 minutes, 250 ppm of TPT was added to the reactor and an in situ complexation between phosphoric acid and TPT was carried out for 40 minutes under $N_2$ atmosphere to form a catalyst solution. Then, 87.4 g of DMT, and 80 g of additional BDO were introduced into the catalyst solution and, for ester interchange, the temperature was increased to 220° C. with a rate of 2° C./min while stirring at 260 rpm under nitrogen. After the volatiles from methanol ceased, the temperature of the reaction mixture was further increased to 250° C. Polymerization was initiated with the vacuum adjusted to below 1 Torr for 40 minutes. The polymerization was stopped after achieving desired intrinsic viscosity.

Example 4

Example 4 was implemented in the presence of the new titanium-containing polyester catalyst prepared in situ through the complexation between TPT and phosphoric acid in a 1:1 molar ratio. First, 50 g of BDO and the phosphoric acid solution (0.1 g/ml in water) were introduced into a three-neck round bottom flask. The reactor was placed in an oil bath at a temperature of 175° C. After 20 minutes, 250 ppm of TPT was added to the reactor, and an in situ complexation between phosphoric acid and TPT was carried for 40 minutes under $N_2$ atmosphere to form a catalyst solution. Then, 87.4 g of DMT and 80 g of additional BDO were introduced into the catalyst solution and, for ester interchange, the temperature was increased to 220° C. at a rate of 2° C./min while stirring at 260 rpm under nitrogen. After the volatiles from methanol ceased, the temperature of the reaction mixture was further increased to 250° C. The polymerization was initiated with vacuum adjusted to below 1 Torr for 40 minutes. The polymerization was stopped after achieving the desired intrinsic viscosity.

Example 5

Example 5 was implemented in the presence of the new titanium-containing polyester catalyst prepared in situ through the complexation between TPT and phosphoric acid in a 1:1.2 molar ratio. First, 50 g of BDO and the phosphoric acid solution (0.1 g/ml in water) were introduced into a three-neck round bottom flask. The reactor was placed in an oil bath at a temperature of 175° C. After 20 minutes, 250 ppm of TPT was added to the reactor and an in situ complexation between the phosphoric acid and TPT was carried out for 40 minutes under a $N_2$ atmosphere to form a catalyst solution. Then, 87.4 g of DMT and 80 g of additional BDO were introduced into a catalyst solution and, for ester interchange, the temperature was increased to 220° C. at a rate of 2° C./min while stirring at 260 rpm under nitrogen. After volatiles from methanol ceased, the temperature of the reaction mixture was further increased to 250° C. The polymerization was initiated with the vacuum adjusted to below 1 Torr for 40 minutes. The polymerization was stopped after achieving the desired intrinsic viscosity.

Example 6

Example 6 was implemented in the presence of the new titanium-containing polyester catalyst prepared in situ through the complexation between TPT and phosphoric acid in a 1:1.5 molar ratio. First, 50 g of BDO and the phosphoric acid solution (0.1 g/ml in water) were introduced into a three-neck round bottom flask. The reactor was placed in an oil bath temperature of 175° C. After 20 minutes, 250 ppm of TPT was added to the reactor and an in situ complexation between phosphoric acid and TPT was carried out for 40 minutes under $N_2$ atmosphere to form a catalyst solution. Then, 87.4 g of DMT and 80 g of additional BDO were introduced into the catalyst solution. For ester interchange, the temperature was increased to 220° C. at a rate of 2° C./min while stirring at 260 rpm under nitrogen. After volatiles from methanol ceased, the temperature of the reaction mixture was further increased to 250° C. The polymerization was initiated and carried out with the vacuum adjusted to below 1 Torr for 40 minutes. The polymerization was stopped after achieving the desired intrinsic viscosity.

Example 7

Example 7 was implemented in the presence of the new titanium-containing polyester catalyst prepared in situ through the complexation between TPT and phosphoric acid in a 1:2 molar ratio. First, 50 g of BDO and the phosphoric acid solution (0.1 g/ml in water) were introduced into a three-neck round bottom flask. The reactor was placed in an oil bath at a temperature of 175° C. After 20 minutes, 250 ppm of TPT was added to the reactor and an in situ complexation between phosphoric acid and TPT was carried for 40 minutes under a $N_2$ atmosphere to form a catalyst solution. Then, 87.4 g of DMT and 80 g of additional BDO were introduced into the catalyst solution. To obtain ester interchange, the temperature was increased to 220° C. at a rate of 2° C./min while stirring at 260 rpm under nitrogen. After volatiles from methanol ceased, the temperature of the reaction mixture was further increased to 250° C. The polymerization was initiated and carried out with the vacuum adjusted to below 1 Torr for 40 minutes. The polymerization was stopped by removing the vacuum after achieving the desired intrinsic viscosity.

The PBT resin synthesized in Examples 1-7 were tested and results shown in Table 1 below:

TABLE 1

| Ex. No. | Mole Ratio Phosphoric Acid/TPT | TPT Catalyst Amount (ppm) | IV (dL/min) | $T_m$ (° C.) | PDI | $M_n$ | $M_w$ |
|---|---|---|---|---|---|---|---|
| C-1 | 0 | 250 | 0.831 | 223 | 2.7 | 28000 | 76000 |
| 2 | 0.3 | 250 | 0.774 | 223 | 2.7 | 27000 | 71000 |
| 3 | 0.6 | 250 | 0.703 | 225 | 2.8 | 25000 | 71000 |
| 4 | 1 | 250 | 0.766 | 224 | 2.8 | 25000 | 70000 |
| 5 | 1.2 | 250 | 0.737 | 224 | 2.9 | 23000 | 67000 |
| 6 | 1.5 | 250 | 0.540 | 224 | 2.4 | 15000 | 37000 |
| 7 | 2 | 250 | 0.170 | 213 | 2.4 | 3100 | 7300 |

Table 1 summarizes the intrinsic viscosity, melting temperature, and molecular weight of the samples of PBT resin as prepared through the polycondensation reaction between DMT and BDO. PDI was obtained from molecular weight distribution curves obtained from gel permeation chromatography analysis. Example C-1 is the control sample prepared in the presence of conventional TPT transesterification catalyst. Examples 2-6 were synthesized with the in situ catalyst, prepared through the reaction of TPT and phosphoric acid at various mol ratios, as calculated based on the amounts of the phosphoric acid and TPT used for the catalyst preparation. A strong correlation was also found between the IV and number average molecular weight results of the resins.

Figure 1:
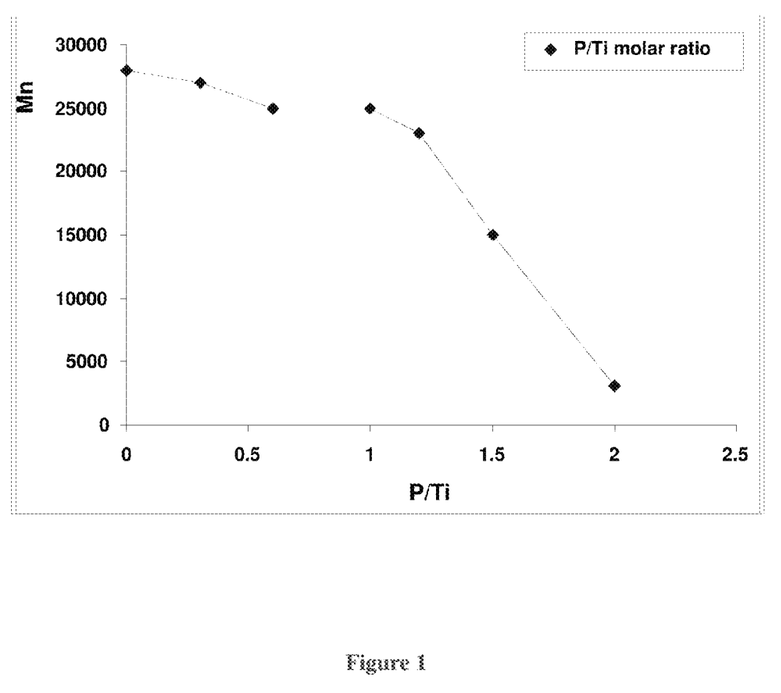
FIG. 1 shows the correlation between number average molecular weight change and the molar ratio of phosphoric acid and TPT used in the preparation of an in situ catalyst for use, in a process for the polymerization of a polyalkylene terephthalate according to Examples 2-7.

The new titanium-containing catalyst was found to enable high molecular weight polyester when employing a molar ratio between phosphoric acid and TPT of up to 1.2, which were the molar ratios used in Examples 2-5, as shown in FIG. 1. Above these ratios, the molecular weight of the polyester was found to drop gradually and oligomers were obtained at the molar ratio of 2 in Table 1.

Figure 2:
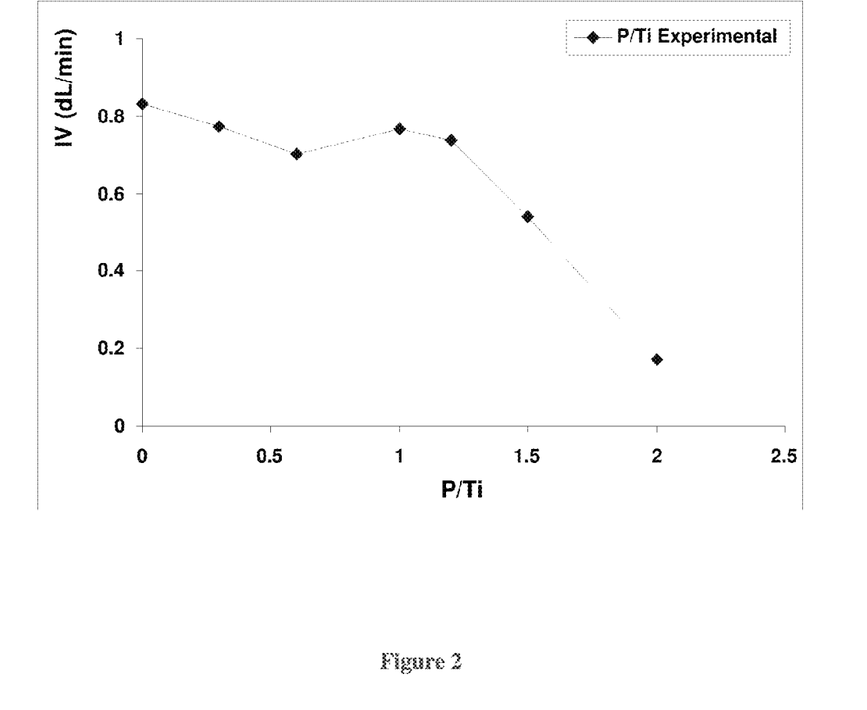
FIG. 2 shows the correlation between the intrinsic viscosity and the molar ratio of phosphoric acid and TPT used in the preparation of an in situ catalyst, in a process for the polymerization of a polyalkylene terephthalate in accordance with Examples 2-7.

The IV of the resins followed almost the same trend as molecular weight, as shown in FIG. 2. The IV of the resin started decreasing gradually after the molar ratio of 1.2. The catalyst did not significantly affect the crystallinity of PBT resins as indicated by the melting point. Almost every resin except that of Example 7 obtained the same melting temperature as the control (Comparative Example C-1).

In view of the above, the synthesis of a polyalkylene terephthalate such as PBT by a melt polycondensation reaction between DMT and BDO was effectively accomplished in the presence of in situ catalyst prepared by the reaction of TPT and phosphoric acid prior to ester interchange. It was also demonstrated that the molar ratio between phosphoric acid and TPT can be controlled to obtain the same performance shown by the comparative process. In these examples, the ratio of 1.2 is the maximum molar ratio that was found to obtain the desired molecular weight, IV, and melting temperature within the given limits. The molar ratios above 1.2 resulted in a molecular weight drop in the examples.

Although the present invention has been described in detail with reference to certain preferred versions thereof, other variations are possible. Therefore, the spirit and scope of the appended claims should not be limited to the description of the versions contained therein.

What is claimed is:

1. A process of preparing a polyalkylene terephthalate comprising reacting an alkylene diol and a dicarboxy aromatic compound selected from the group consisting of aromatic dicarboxylic acids, aromatic dicarboxylic ($C_1$-$C_3$)alkyl esters, and combinations thereof, wherein the process comprises:
    forming a catalyst that consists of the reaction product of tetra($C_1$-$C_8$ alkyl) titanate and phosphoric acid;
    obtaining ester interchange by combining the catalyst with the alkylene diol and the aromatic dicarboxy compound; and
    polymerizing the product of ester interchange, in the continued presence of the catalyst, yielding polyalkylene terephthalate;
    wherein the polyalkylene terephthalate excludes adipic acid groups.

2. The process of claim 1, wherein the catalyst is prepared in situ by combining the tetra($C_1$-$C_8$ alkyl) titanate, phosphoric acid, and the alkylene diol prior to ester interchange between the alkylene diol and dicarboxy aromatic compound.

3. The process of claim 1, wherein the aromatic dicarboxy compound is virgin terephthalic acid or dimethyl terephthalate or produced by depolymerizing recycled polyethylene terephthalate.

4. The process of claim 1, wherein the alkylene diol is produced from biomass.

5. The process of claim 1, wherein the alkylene diol is selected from the group a 1,4-butanediol group, 1,3-propanediol group, 1,4-cyclohexane dimethanol, and combinations thereof.

6. The process of claim 1 comprising forming the catalyst in situ, in a first mixture, by combining the tetra($C_1$-$C_8$ alkyl) titanate, phosphoric acid, and alkylene diol, prior to introduction of the aromatic dicarboxy compound, under heat at an elevated first temperature.

7. The process of claim 6 comprising forming a second mixture by introducing the aromatic dicarboxy compound, optionally with additional alkylene diol, into the first mixture and subjecting the second mixture to heat to obtain ester interchange at an elevated second temperature.

8. The process of claim 7 comprising carrying out ester interchange until the production of methanol volatiles substantially ceases.

9. The process of claim 7, wherein polymerization is initiated under vacuum, after substantial completion of the ester interchange between the alkylene diol and the dicarboxy aromatic compound, by increasing the temperature to a third temperature, for polymerization, higher than the second temperature for ester interchange.

10. The process of claim 9 comprising subjecting the reaction mixture to vacuum, optionally with distillation, at a pressure of less than 2 Torr and a temperature of 220° C. to 270° C., to form molten polyalkylene terephthalate having a preselected final intrinsic viscosity or number average molecular weight.

11. The polyester of claim 1, wherein the catalyst is formed employing a phosphoric acid:titanate molar ratio of 0.05:1 to 2:1.

12. The process of claim 1, wherein the tetra($C_1$-$C_8$ alkyl) titanate is added in a total amount of 25 to 1000 ppm based on the total weight of the alkylene diol and carboxy aromatic compound.

13. The process of claim 1, wherein the alkylene diol is 1,4-butanediol or 1,3-propanediol.

14. The process of claim 1, wherein the dicarboxy aromatic compound is selected from the group terephthalic acid, di($C_{1-3}$)alkyl ester thereof, isophthalic acid, di($C_{1-3}$)alkyl ester thereof, and combinations thereof.

15. The process of claim 1, wherein all of the diacid groups in the resulting polyalkylene terephthalate are aromatic.

16. A process of preparing a polyalkylene terephthalate by reacting an alkylene diol and an aromatic dicarboxy compound selected from the group consisting of aromatic dicarboxylic acids, aromatic dicarboxylic ($C_1$-$C_3$)alkyl esters, and combinations thereof, comprising forming a catalyst in situ, in a first mixture, by combining a tetra($C_1$-$C_8$ alkyl) titanate, phosphoric acid, and alkylene diol, prior to introduction of the aromatic dicarboxy compound, wherein the first mixture is subjected to heat at an elevated first temperature, and wherein the catalyst that is formed consists of the reaction product of the phosphoric acid and the tetra($C_1$-$C_8$ alkyl) titanate in a molar ratio of from more than 0.05:1 to less than or equal to 2:1;

forming a second mixture by introducing the aromatic dicarboxy compound, optionally with additional alkylene diol, into the first mixture and subjecting the second mixture to heat to obtain ester interchange at an elevated second temperature;

polymerizing the second mixture under vacuum, after substantial completion of the ester interchange, optionally with distillation, at a pressure of less than 2 Torr and at an elevated third temperature for polymerization, higher than the second temperature for ester interchange, and in the range of 220° C. to less than 270° C., thereby polymerizing the second mixture and forming molten polyalkylene terephthalate; and stopping the polymerization when obtaining an intrinsic viscosity of 0.4 to 2.0 dl/g;

wherein the polyalkylene terephthalate excludes adipic acid groups.

* * * * *